United States Patent [19]

Hawkins et al.

[11] 4,110,553

[45] Aug. 29, 1978

[54] SPRING FRICTION DAMPER

[75] Inventors: Ronald G. Hawkins, Massena, N.Y.; Paul D. Tuttle, Marshall, Tex.; Mark A. Baker, Massena, N.Y.

[73] Assignee: Aluminum Company of America, Pittsburgh, Pa.

[21] Appl. No.: 760,180

[22] Filed: Jan. 17, 1977

[51] Int. Cl.² .......................................... H02G 7/14
[52] U.S. Cl. ................................................. 174/42
[58] Field of Search ................... 174/42; 248/358 AA; 267/136

[56] References Cited

U.S. PATENT DOCUMENTS

| Re. 26,602 | 6/1969 | Taylor | 174/42 |
|---|---|---|---|
| 2,132,319 | 10/1938 | Preiswerk | 174/42 |
| 3,870,815 | 3/1975 | Hawkins | 174/42 |

*Primary Examiner*—Laramie E. Askin
*Attorney, Agent, or Firm*—Elroy Strickland

[57] ABSTRACT

A device for damping vibration, such as aeolian, of a suspended conductor. The device comprises at least one helical spring, at least a portion of the turns of which are close wound, and means for attaching the spring to a conductor in spaced relation thereto. At least one inertial weight is mounted on or attached to the spring so that the weight can be resiliently suspended from the conductor by the spring and attaching means. The inertial weight is effective to relatively translate and thereby provide sliding friction between the close wound turns of the spring in a direction perpendicular to the axis of the spring when an associated conductor undergoes vibration above a given magnitude, and to bend the helical spring such that adjacent close wound turns of the spring separate from and impact against each other, the sliding friction and impacts between the turns of the spring being effective to dissipate the energy of the vibration of the conductor in the form of heat.

27 Claims, 16 Drawing Figures

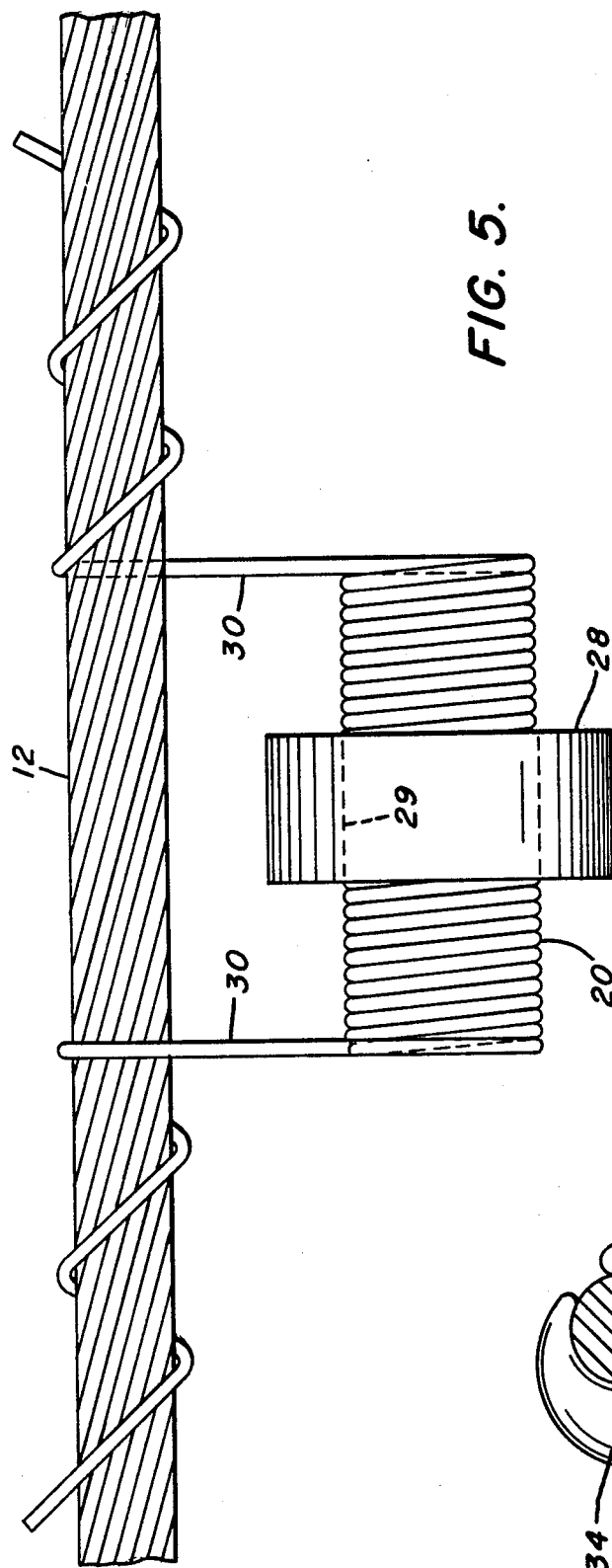
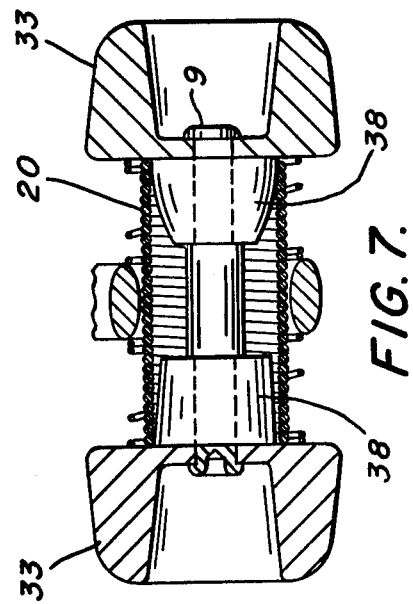
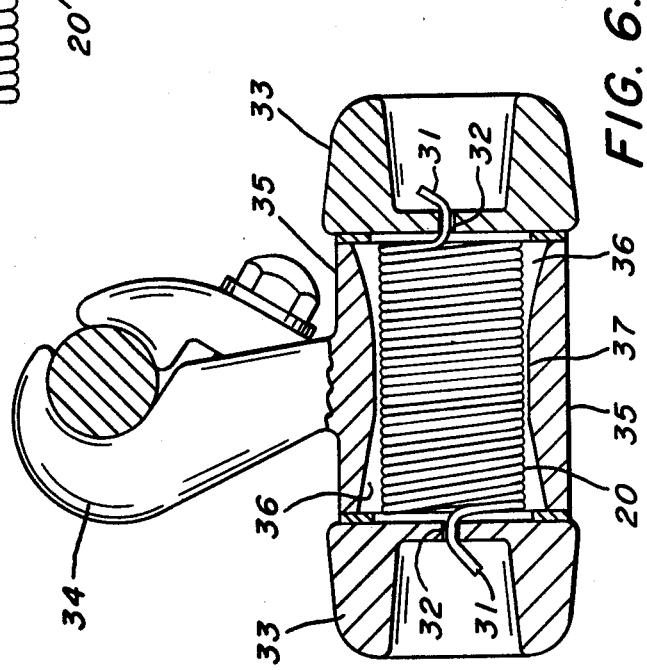

4,110,553

SPRING FRICTION DAMPER

BACKGROUND OF THE INVENTION

The present invention relates generally to damping devices for overhead conductors, and particularly to a device capable of efficiently and effectively controlling to a safe level the vibration of a conductor, the device employing sliding friction between adjacent turns of a close wound, helical spring as the damping mechanism and impacts between adjacent turns if the frequency of vibration is sufficiently high.

As is well known in the industry, the Stockbridge damper has been used extensively to dampen aeolian vibration of single conductors and conductor bundles, a more recent proposal involving the Stockbridge damper being described on pages 108 and 109 of the Mar. 15, 1976 issue of *Electrical World.* As indicated in this article, Stockbridge dampers usually employ two inertial weights or masses attached to the opposed ends of a stranded steel cable. Means for clamping the stranded cable to an overhead conductor is attached to the cable between the locations of the weights. Though such a structure has performed well over the years as a device for damping aeolian vibration of individual conductors, the power transmission and distribution industry seeks apparatus and equipment that improves and enhances their ability to render service.

BRIEF SUMMARY OF THE INVENTION

The present invention involves a device providing such improvement for the industry, the device being a simple structure employing at least one close coil spring and inertial mass or weight (in one embodiment) resiliently supported by the spring. The device, in addition, includes means, such as a two-piece conductor clamp, for attaching the spring and weight to an overhead suspended conductor, though the invention is not limited thereto. With the spring and weight attached to the conductor, upon the occurrence of vibratory motion of the conductor, the inertial weight forces vibratory translations of adjacent coils of the helical spring relative to one another across the axis of the spring and, with sufficient vibration amplitude, vibratory separating and impacting of adjacent coils of the spring to effect damping of the conductor vibration by dissipating the energy thereof in the form of heat.

BRIEF DESCRIPTION OF THE DRAWINGS

The objectives and advantages of the invention will be better understood from consideration of the following detailed description and accompanying drawings, in which:

FIGS. 2 through 15 are views (mostly sectional) of additional embodiments of the basic invention.

PREFERRED EMBODIMENTS OF THE INVENTION

Figure 1:
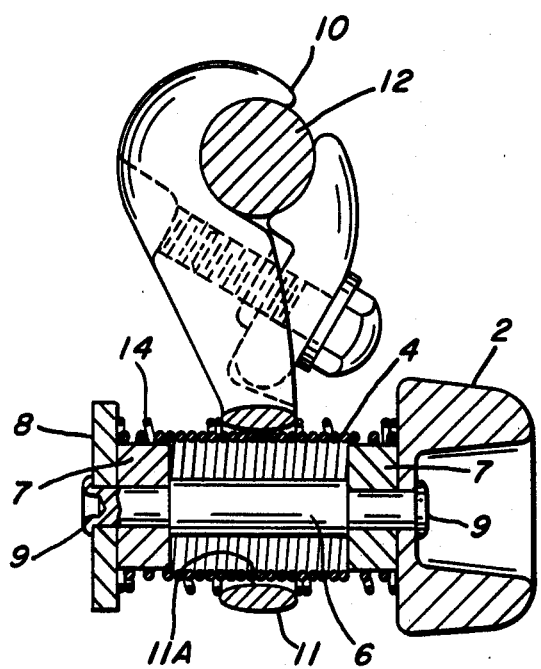
FIG. 1 is a sectional view of an embodiment of the invention involving a minimum of components.

Referring now to the drawings, FIG. 1 thereof shows a simplified embodiment of the invention in which a single weight 2 is fastened to one end of a helical spring 4 by a pin 6 (extending through the spring) and a washer 8 suitably attached to the pin at the end of the spring opposed to that of the weight. The washer and weight can, for example, be fixed to the ends of spring 4 by riveting the ends of the pin, which riveting forms heads 9, as shown in FIG. 1. The turns of the helical spring or at least a major portion thereof are "close coil" turns, i.e., the spring is formed such that adjacent ones of its turns are in physical contact with each other under an initial predetermined force, as provided by the design parameters of the spring. In addition, the compression of the spring, and thus the intercoil friction occurring in the damping function, as described hereinafter, can be further controlled by providing the end portions of spring 4 with open wound turns (as shown) and a length slightly larger than the distance between weight 2 and washer 8 when the device is assembled. In this manner, when the device is assembled, the open coils are compressed to insure compression of the total spring between the weight and washer. The end turns of spring 4 extend over spacers 7 which may be structures separate from or integral with weight 2 and washer 8.

The device of FIG. 1 is shown provided with a two-piece clamp structure 10 for clamping the device to an overhead suspended conductor 12. The clamp has an arm portion or extension 11 provided with an opening 11A through which spring 4 extends. The clamp arm is shown centered or appropriately located along the longitudinal extent of spring 4 by two open coil helical springs 14 located around spring 4 and between arm 11 and the washer 8 on one side of the clamp, and the weight 2 on the other side.

With vibration of conductor 12, the device of FIG. 1 functions to quickly control and stop such vibration via sliding friction of adjacent turns of spring 4 and by impacts between adjacent turns of the spring if the frequency of vibration is sufficiently large. Relative movement of the turns of the spring is caused by the arm 11 of clamp 10 translating the turns of the spring against the inertia of weight 2, i.e. the vibratory motion of the conductor causes the clamp arm 11 to relatively translate the turns of spring 4 in a vibratory manner such that adjacent turns of the spring slide against each other. In addition, if the energy of vibration is substantially large, with downward motion of the arm in the vibration cycle, the coil arcs in a manner that opens the coils of the spring on the lower side thereof. When the conductor and clamp arm move up in the vibratory cycle, the lower side of the spring rapidly closes such that adjacent coils impact against each other, as the upper portion of the spring begins to open. At the completion of the upper movement of the clamp arm, the turns of the spring on the upper side thereof are separated from each other such that they impact against each other when the clamp arm travels down (again) in the vibratory cycle.

Further, since the weight 2 is on one side of the clamp arm 11, the portion of the spring between the arm and the weight tends to rotate about the fulcrum provided by the clamp arm 11 when conductor 12 vibrates vertically. This promotes sliding friction and impacts between the turns of the spring on the side of the arm of weight 2 in performing the damping function.

The damping function and capability just described are efficient in terms of the amount of vibration energy rapidly dissipated, as explained further hereinafter, and in terms of the cost of the device. The number of components in the embodiment of FIG. 1 is small, i.e., only three springs, one pin, one washer, one inertial weight and one conductor clamp are involved. In addition, the clamp is relatively small in size and structural requirement, as the forces the clamp is required to withstand are not large. The washer 8 has a small mass, and may itself by replaced by an inertial weight having a mass less than that of weight 2, or, as in case of the embodiments of FIGS. 6, 7, 9, 13, 14 and 15, two inertial weights of equal mass.

Figure 2:
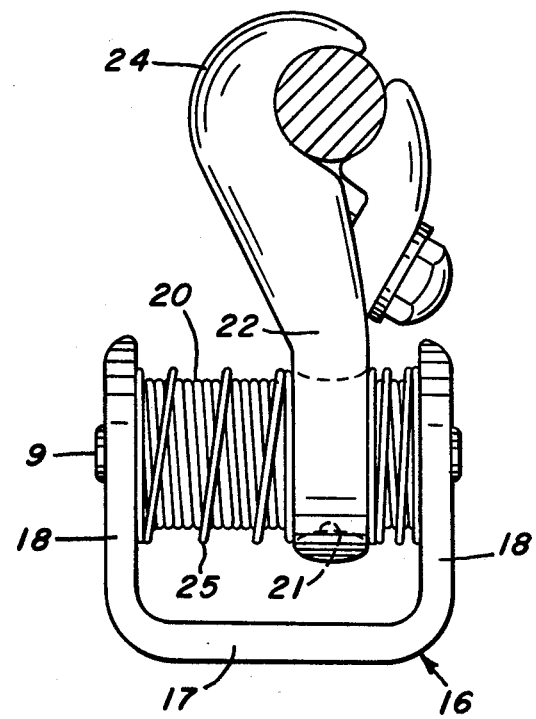
Figure 3:
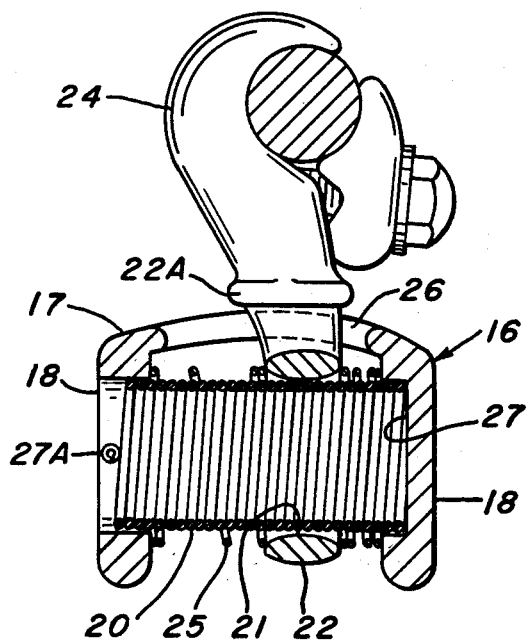

FIGS. 2 and 3 show a damping device in which a single inertial weight 16 is employed that is a yoke type of structure, the structure having a base 17 and integral arms 18 connected to the opposed ends of a close coil helical spring 20. Again, the helical spring extends through an opening 21 provided in an arm extension 22 of clamp 24, and a positioning means, such as an open turn helical spring 25, properly locates the clamp structure between the ends of the spring. In FIG. 2, the yoke 16 faces in an upward direction (and in the direction of clamp 24) such that clamp arm 22 extends into the space between yoke arms 18. However, in FIG. 3, the yoke faces in a downward direction and is provided with an opening 26 in base 17 to accommodate the arm of the conductor clamp. In both embodiments, a securing pin, such as pin 6 of FIG. 1, can be eliminated in the manner shown in FIG. 3, i.e., the arms 18 of yoke 16 can be provided with recesses 27 sized to accommodate the ends of spring 20. Spring 20 is secured in yoke 16 (in FIG. 3) by butting against base of recess 27 at one end of the yoke and a pin 27A at the opposite end, pin 27A extending through arm 18 of the yoke in a direction perpendicular to the axis of the spring. Extremes of travel of yoke 16 are limited by a peripheral lobe 22A provided on clamp extension 22 and the yoke 16, the opening 26 in yoke 16 being a relatively narrow slot extending lengthwise of the yoke.

The operation of the devices of FIGS. 2 and 3 is essentially the same as that described above in connection with the device of FIG. 1, particularly if the clamp arm 22 is not centered on the close coil spring 20 (as shown) so that rotation of spring 20 about the fulcrum of 22 is effected by vibration of an associated overhead conductor.

Figure 4:
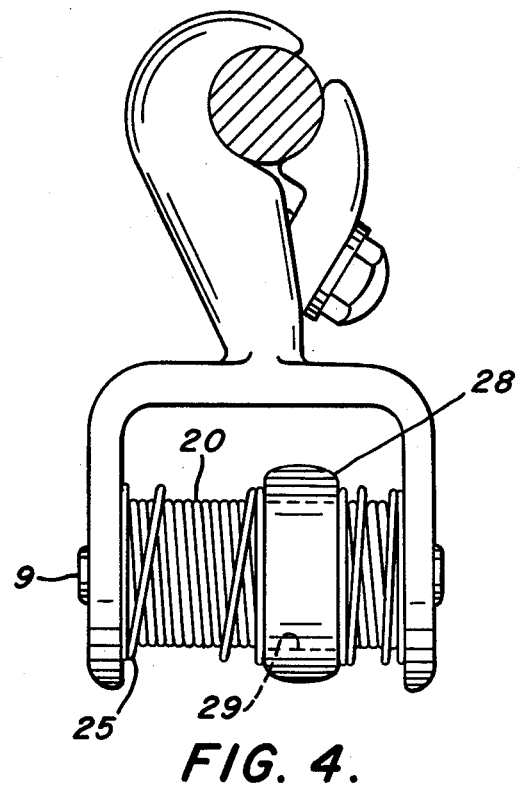

FIG. 4 is an embodiment of the invention in which the two-piece conductor clamp takes the form of a yoke (from FIGS. 2 and 3) and thereby engages the ends of damping spring 20, while the inertial weight can be a single-piece body 28 mounted on the spring between the arms of the clamp yoke. The weight, in this embodiment, is provided with an opening 29 through which the spring extends.

In FIG. 5 of the drawings, a damper is shown in which the two-piece conductor clamp of the previous embodiments is eliminated and is replaced by integral, preformed, helical extensions 30 of the ends of the damping spring 20 that are adapted to be wrapped around a suspended conductor (12) in a well known manner. Again, a single weight 28 is located on the spring (in the manner of FIG. 4) between extensions 30 and may be mechanically secured on or otherwise located along the extent of the spring by appropriate spacing means (not shown in FIG. 5).

FIG. 6 shows another embodiment of the invention in which a main securing pin, such as 6 in FIG. 1, is not needed. In FIG. 6, damping spring 20 is provided with integral C-shaped extensions 31 which extend through appropriately sized openings 32 provided in opposed inertial weights 33 to secure the weights and spring together. In addition, a conductor clamp 34 is provided with an elongated, lateral extension 35 that houses the damping spring in an opening 36 extending through the extension. Further, the opening can be provided with a diameter or cross section that descreases in the direction of the longitudinal center of 35. This provides a center portion 37 of 35 that is located in close proximity or actual engagement with the turns of the spring located opposite 37. The change in cross section may be either linear or curved (bellmouth) or both, as depicted in FIG. 6.

The changing diameter of opening 36 provides the damper of FIG. 6 with a variable damping characteristic, such that, with low amplitude movement of an associated conductor, only the central portion 37 of the clamp engages the portion of spring 20 in the immediate vicinity of 37 to provide damping translation of the spring. With increased amplitude and vibration energy, the tapered portions of the extension adjacent the central portion engage additional turns of the spring, thereby reducing the effective length of the spring such that the spring is now harder and more resistant to the motion of clamp 34.

A similar variable damping and stiffness effect is provided by the structure depicted in FIG. 7. In this structure, opposed weights 33 are provided with inwardly facing shoulders 38 having a diameter or cross section that decreases in the direction of the opposite shoulder. This provides opposed tapered (linear or bullet-nosed, or both) surfaces for engaging damping spring 20, which is mounted on the shoulders, so that the number of turns of the spring set into damping motion upon the occurrence of vibration of an associated conductor is dependent upon the amplitude and energy of the vibration. The weights 33 and spring 20 in FIG. 7 may be secured together by a pin extending through the weights and spring, as in the manner of FIG. 1.

Figure 8:
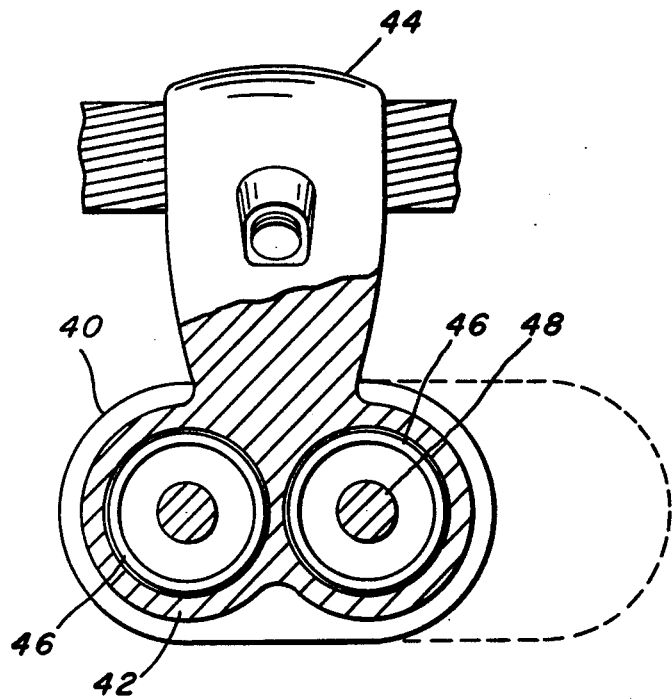

A dual spring embodiment of the present invention is shown in side elevation in FIG. 8 of the drawings. In FIG. 8, only one elongated weight 40 is shown so that an arm extension 42 of conductor clamp 44 is visible. In the view of FIG. 8, the ends of two side-by-side damping springs 46 are visible (in elevation) and extend respectively through two openings provided in the clamp extension in the manner of the openings 11A and 21 shown and described respectively in FIGS. 1 and 3. The weight or weights 40 (an additional weight can be located at the end of springs 46 visible in FIG. 8, and generally in the manner shown in FIGS. 6, 7 and 9) are shown attached to one or both ends of the springs by pins 48 (shown in section) which extend, respectively, through the centers of springs 46. In addition, as shown in dash outline in FIG. 8, to enhance rocking motion of the weight or weights 40 relative to clamp 44, and thus to enhance damping, one end of the weight or weights may be somewhat longer (providing additional mass) than the other end so that the weight is unbalanced in the direction of the greater length and mass, with the center of gravity being shifted in the direction of the longer length and larger mass.

The springs 46 in the embodiment of FIG. 8 need not be of the same size if it is desired to provide the damper with a capability of damping two different vibration frequencies, i.e., for a given weight, a weaker or softer spring will be worked by low frequency, low energy vibration of an associated conductor, whereas a stronger or harder spring will not be worked by such low energy vibration. The turns of the larger or harder spring will be translated upon the occurrence of relatively high frequency and energy vibration of an associated conductor. Structures providing such a capability are shown in FIGS. 9 to 12 of the drawings.

Figure 9:
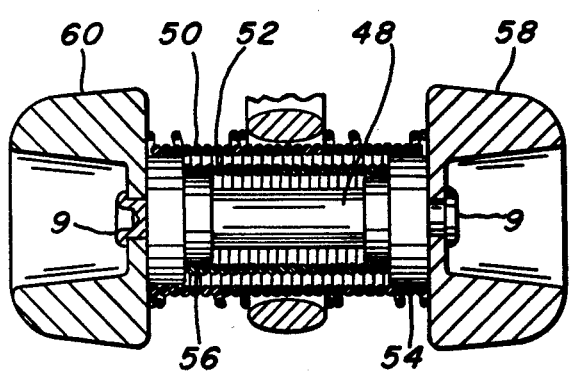

In FIG. 9, a dual spring arrangement is shown in which two concentric springs 50 and 52 are mounted and secured respectively on two opposed shoulders or ledges 54 and 56 associated with two opposed damping weights 58 and 60. In operation, the outside spring 50, being longer, and of larger diameter than 52, in softer than the shorter inside spring (assuming the same wire material and size for both springs), such that with low frequency vibration of an associated conductor, the turns of the outside spring are translated to effect damping. Upon the occurrence of sufficiently high frequency vibration, the clamp arm of the device (and the outer spring) is moved into contact with the inner spring to cause a translation of the turns of the inner spring, the action of the two springs combining to effect damping of the greater vibration energy.

Figure 10:
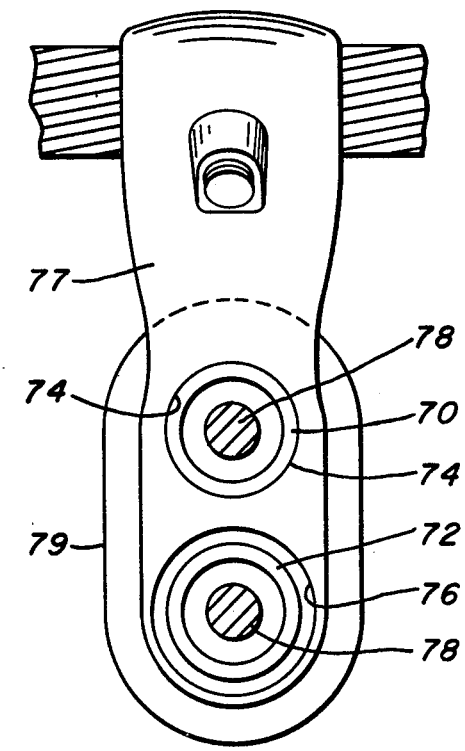

In FIG. 10 of the drawings a damper is shown in which relatively high and low amplitude energies are capable of being damped. Two springs 70 and 72 of the same construction (wire size and material) are shown located respectively in different diameter openings 74 and 76 provided in clamp arm 77 of the damper. In FIG. 10, opening 74 is sized to have the clamp arm engage spring 70 around substantially its entire periphery, with the damper being in an atrest position, whereas opening 76 is substantially larger than the diameter of spring 72, with the clamp arm out of substantial contact with the spring. With such a structure, a lower amplitude vibration immediately sets the turns of spring 70 into sliding motion to effect damping, while such low amplitude vibration is not sufficient to bring clamp 77 and spring 72 into substantial physical contact with each other. With higher energy vibration, however, the clamp arm 77 and spring 72 are brought into engagement to effect damping action, the damping action including impacts between spring 72 and the surface of clamp arm provided by opening 76. In FIG. 10, only one inertial weight 79 is shown though two such weights can be attached to the springs by pins 78 shown in cross section.

Figure 11:
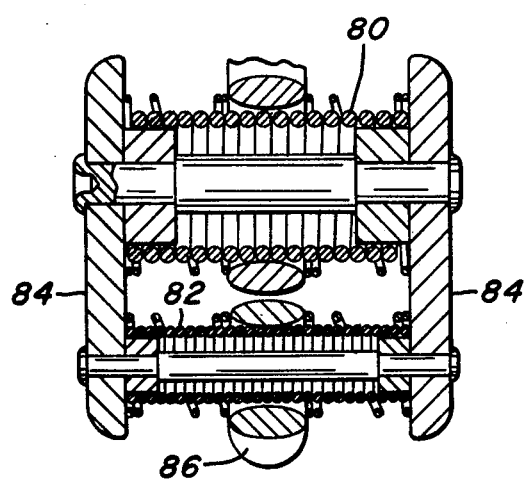
Figure 12:
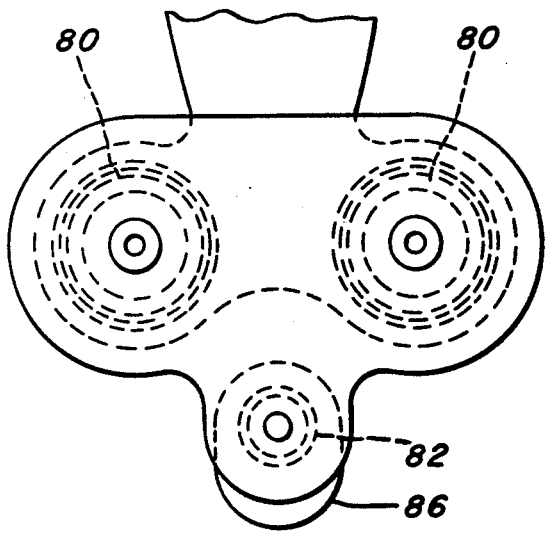

FIGS. 11 and 12 are respectively sectional and end elevation views of a three-spring arrangement capable of providing damping of both high and low frequency vibratory motion. More particularly, two relatively hard, large diameter springs 80 and a softer, smaller diameter spring 82, are shown mounted in spaced relationship between two inertial weights 84. On the small diameter spring 82 is mounted an additional weight 86 of a relatively small mass. Again, the small diameter spring provides damping for low frequency vibration while the larger springs provide damping for higher frequency vibration.

Figure 13:
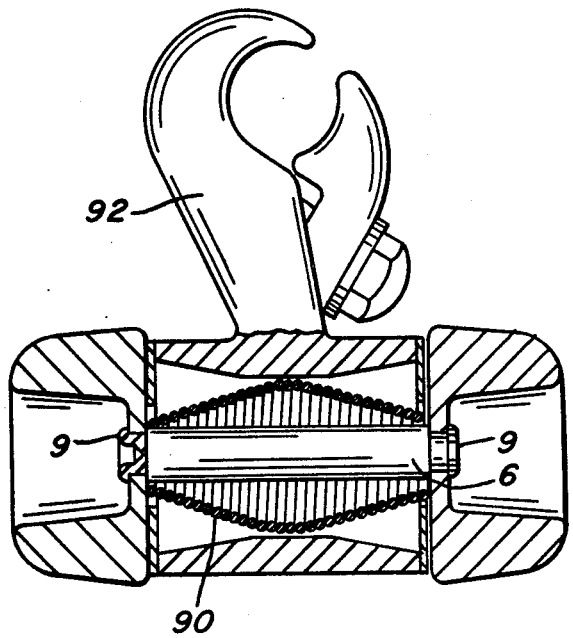

In the embodiments of the invention thus far described, the diameter of each of the damping springs has been depicted as substantially constant. In FIG. 13, however, a close coil damping spring 90 is shown having a diameter that changes along its length, with the greater diameter being disposed at the suspension location of a conductor clamp 92. From the suspension (or center) location, the spring tapers toward minimum diameters at its end locations. The remainder of the structure in FIG. 13 is similar to that of FIG. 6 described earlier, except for the means of attaching inertial weights to the spring.

The structure of FIG. 13 provides (again) a variable damping characteristic with low frequency movement of an associated conductor being damped by the larger and softer turns of spring 90. The smaller diameter turns are not only stiffer than the larger turns, but less friction (in comparison with the larger turns) can be provided between adjacent turns because of the smaller overall area of contact between adjacent turns.

Other advantages flow from the structure of FIG. 13. Because portions of the turns of spring 90 have small diameters, less material is required to make the spring. This, in addition, reduces the cost of pin 6 since shoulders on the pin are not required. Further, as each coil becomes smaller in diameter, the initial tension of the spring automatically increases without requiring any special adjusting equipment in the spring winding process.

Figure 14:
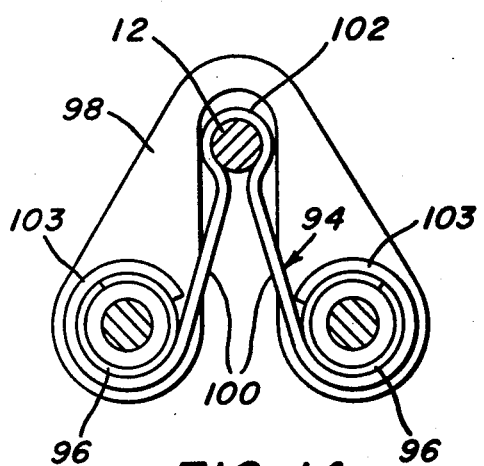
Figure 15:
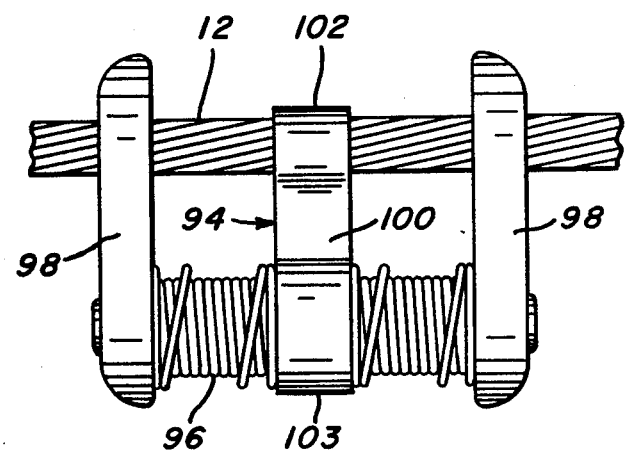

In FIGS. 14 and 15 is shown yet another embodiment of the invention in which efficient vibration damping is effected in terms of both damping capability and the cost of the embodiment. More particularly, FIGS. 14 and 15 show a damping device comprising a clip structure 94 made from flat stock spring material, two spaced apart close coil springs 96 and two flat inertial weights 98, such as inexpensive steel stampings, suitably attached to the opposite ends of the springs. As shown in FIG. 14, clip 94 has two legs 100 that extend downwardly and diverge outwardly from an integral circular portion 102 of the clip adapted to tightly engage and extend around a conductor 12. The lower ends of the clip legs terminate in integral circular portions 103 sized to respectfully engage springs 96. As seen further in FIG. 14, the inertial weights have an essentially inverted U shape or configuration through which conductor 12 extends, the weights being dimensioned and disposed such that they are spaced from and are out of physical contact with the conductor. Inwardly facing integral shoulders or ledges (not shown) can be provided on the weights 98 when they are stamped or otherwise made and/or formed, to support the ends of springs 96.

The efficiency of the spring friction and impact concept of the invention is surprising in comparison to Stockbridge dampers. This is evidenced by the data presented in the graph of FIG. 16. In the graph, damping efficiency is plotted in the $y$ direction against conductor vibration frequencies measured in cycles per second and wind velocity, which are plotted in the $x$ direction.

Figure 16:
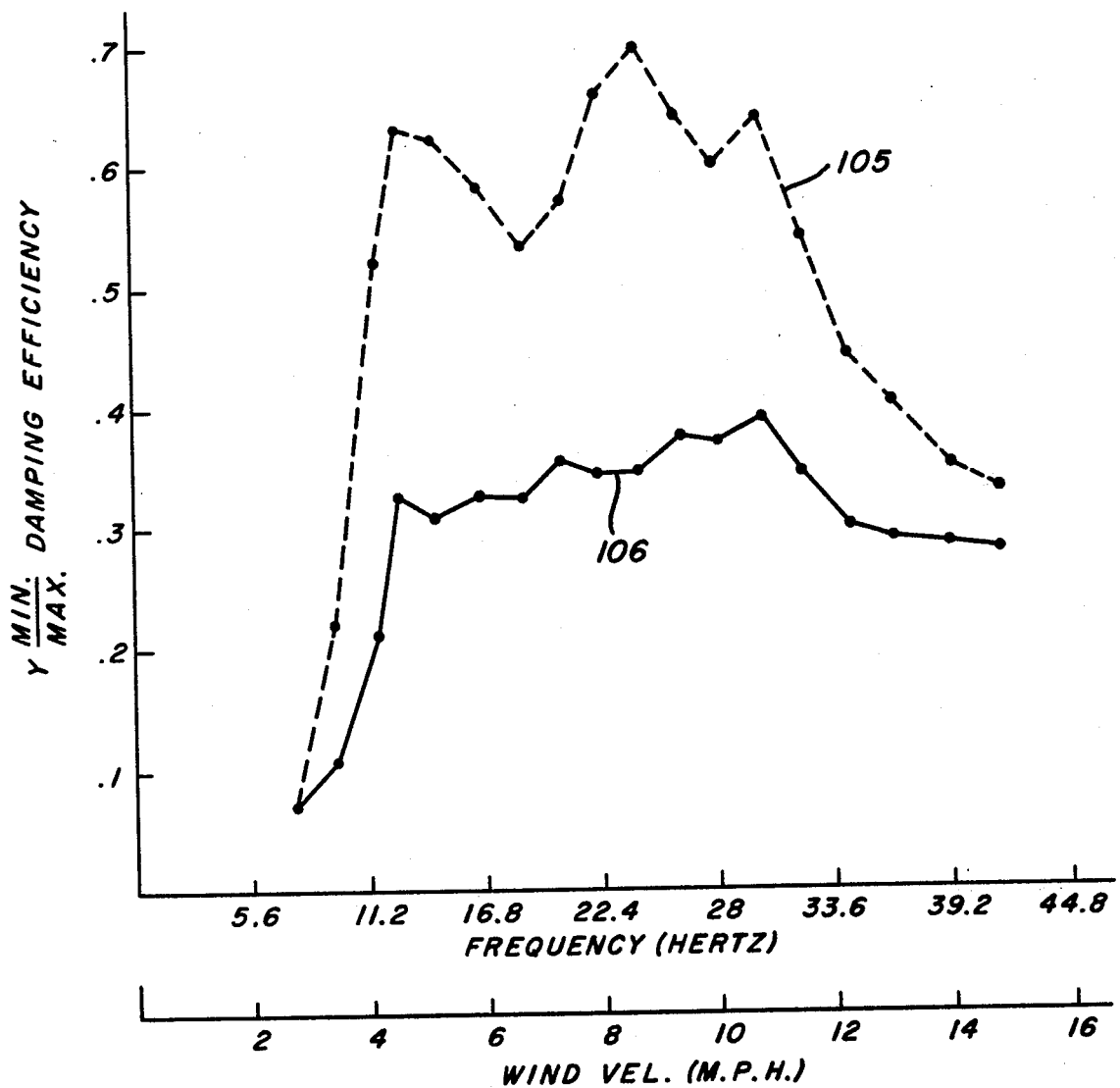
FIG. 16 is a graph comparing the damping efficiency of the damper of FIG. 8 (having two inertial weights) and a Stockbridge damper.

The plots in FIG. 16 are the results of vibration efficiency tests using a 1.165 inch diameter ACSR, Rail conductor as a test conductor. A 6.5 pound damper of the invention having two laterally spaced, horizontally disposed, close coil springs of equal size and construction and two inertial weights of equal mass mounted respectively on the ends of the springs was compared to a 14.9 pound Stockbridge damper. Each damper was attached to the test conductor by a two-piece conductor clamp. The conductor, in testing each damper, was subject to a range of aeolian vibration frequencies starting at about 6 hertz and extending to approximately 42 hertz, as indicated in FIG. 16.

The damping capabilities of the two-spring device of the invention are indicated by dash line 105 and the spaced locations on the graph through which line 105 extends, the spaced locations representing actual recordings of the behavior of the test conductor when the conductor was subjected to the above vibration frequencies. Similarly, the performance of the conductor having the Stockbridge damper attached thereto is indicated by solid line 106 extending between space locations on the graph that represent actual recordings of the behavior of the test conductor.

It is clear from the graph that the lighter, two-spring structure of the invention outperformed the heavier Stockbridge damper by substantial amounts across the entire range of aeolian frequencies tested, which frequencies are the most troublesome for overhead suspended conductors. Further, this result is enhanced by the fact that the Stockbridge damper was heavier by more than twice the weight of the spring friction damper, the heavier device ordinarily providing greater inertia against which to effect damping motion of the steel cables of the Stockbridge damper. Such efficiency on the part of the device of the invention provides substantial savings in the amount of material required of each damper.

Additional tests were performed, involving a variety of designs and weights, to assess the general applicability of the principles of the invention against comparable Stockbridge dampers. In all cases, the performance of the dampers of the present invention were superior to the Stockbridge dampers tested.

While the invention has been described in terms of preferred embodiments, the claims appended hereto are intended to encompass all embodiments which fall within the spirit of the invention.

Having thus described the invention and certain embodiments thereof, we claim:

1. A device for damping vibration of a single, suspended conductor, the device comprising at least one helical spring, at least a portion of the turns of which are close wound, means for attaching said spring to a suspended conductor in spaced relation thereto, and, at least one inertial weight connected to said spring and adapted to be resiliently suspended from a conductor by said spring and attaching means in spaced relation thereto, the inertial weight when suspended from the conductor being effective to relatively translate and thereby provide sliding friction between the close wound turns of the spring in a direction perpendicular to the longitudinal axis of the spring when the conductor undergoes vibration above a given magnitude, the sliding friction of the turns of the spring being effective to dissipate energy of the vibration of the conductor in the form of heat.

2. The device of claim 1 in which the spring is capable of being bent when the associated conductor undergoes vibration such that adjacent turns of the spring separate from and impact against each other to dissipate energy of the vibration.

3. The device of claim 1 in which the means for attaching the helical spring to the conductor includes a clamp structure having opposed clamp portions for engaging the conductor, and means spaced from the clamp portions for engaging the spring.

4. The device of claim 3 in which the inertial weight is attached to the helical spring adjacent one end thereof, and the means spaced from the clamp structure engages the spring at a location along the spring spaced from the inertial weight.

5. The device of claim 1 in which the means for attaching the helical spring to the conductor includes extensions of the spring preformed to engage and wrap around the conductor.

6. The device of claim 1 in which the inertial weight is provided with an opening extending therethrough, with the helical spring extending through said opening.

7. The device of claim 1 in which the axis of the spring is adapted to extend crosswise of the conductor and in generally parallel relation to the ground.

8. The device of claim 1 in which the axis of the spring is adapted to extend in the direction of and generally parallel with the conductor.

9. The device of claim 1 in which the inertial weight comprises two weight means respectively located adjacent opposed ends of the spring.

10. The device of claim 9 in which the weight means are respectively provided with two, concentric, inwardly facing shoulders having two different diameters, a second helical spring located in spaced, concentric relation with the first mentioned helical spring, said springs extending between the weight means, with the ends of the springs being located on the concentric shoulders.

11. The device of claim 9 in which each of the weight means is provided with an inwardly facing, tapered shoulder, the taper of each shoulder providing a decreasing shoulder diameter in the direction of the other shoulder, with the ends of the helical spring being located on said shoulders.

12. The device of claim 9 in which the weight means are of unequal mass.

13. The device according to claim 1 in which the inertial weight comprises a yoke means having a base and integral arms, with said arms engaging the ends of the spring.

14. The device according to claim 13 in which the base of the yoke means is provided with an opening, the means for attaching the spring to a conductor extending through said opening.

15. The device of claim 13 in which the helical spring is provided with at least one turn that is spaced from a next, adjacent turn to provide compressive force on the close wound turns when the spring engages the arms of the yoke.

16. The device of claim 13 in which each arm of the yoke means is provided with an inwardly facing recess, with the ends of the helical spring extending respectively into said recesses, the spring being thereby secured to the yoke means.

17. The device according to claim 13 in which the helical spring is provided with extensions adapted to extend through arms of the yoke means to mechanically connect the spring and yoke means together.

18. The device of claim 1 in which the means for attaching the spring to the conductor includes a yoke structure having arms engaging opposed ends of the spring, with the weight being located between the arms of the yoke.

19. The device of claim 1 in which the inertial weight is an elongated structure extending in the direction generally parallel to the conductor.

20. The device of claim 1 in which the inertial weight is supported by an additional helical spring located in spaced and generally parallel relation to the first mentioned helical spring.

21. The device of claim 20 in which the means for attaching the helical springs to a suspended conductor includes two openings respectively receiving the springs, said openings being provided with inclined surfaces that engage a peripheral portion of the helical springs.

22. The device of claim 20 in which the means for attaching the springs to a suspended conductor includes two openings for respectively receiving the helical springs, the diameter of one of said openings being chosen to provide a tight fit between the spring and attaching means, while the diameter of the other opening is such that its associated spring is free to move crosswise the opening.

23. The device of claim 20 in which the two springs have different diameters.

24. The device of claim 1 including two helical springs in addition to the first mentioned helical spring supporting the weight, with two of the three springs being adapted to provide low frequency damping, and the third spring being adapted to provide high frequency damping.

25. The device of claim 1 in which the means for attaching the spring to the conductor is disposed at an angle with respect to the general plane of the inertial weight.

26. A device for damping vibration of a single suspended conductor, the device comprising at least two, spaced, parallel helical springs, at least a portion of the turns of which are close wound, a preformed, resilient clip for attaching the springs to the suspended conductor in spaced relation thereto, and at least one inertial weight attached to said springs, which weight is adapted to be resiliently supported in spaced relation to a suspended conductor by the springs and preformed clip, the inertial weight being adapted to extend between the springs and around the conductor.

27. The device of claim 26 in which the clip has a preformed, resilient portion for engaging the conductor, and two preformed circular extensions for respectively engaging the helical springs.

* * * * *